Patented Apr. 17, 1934

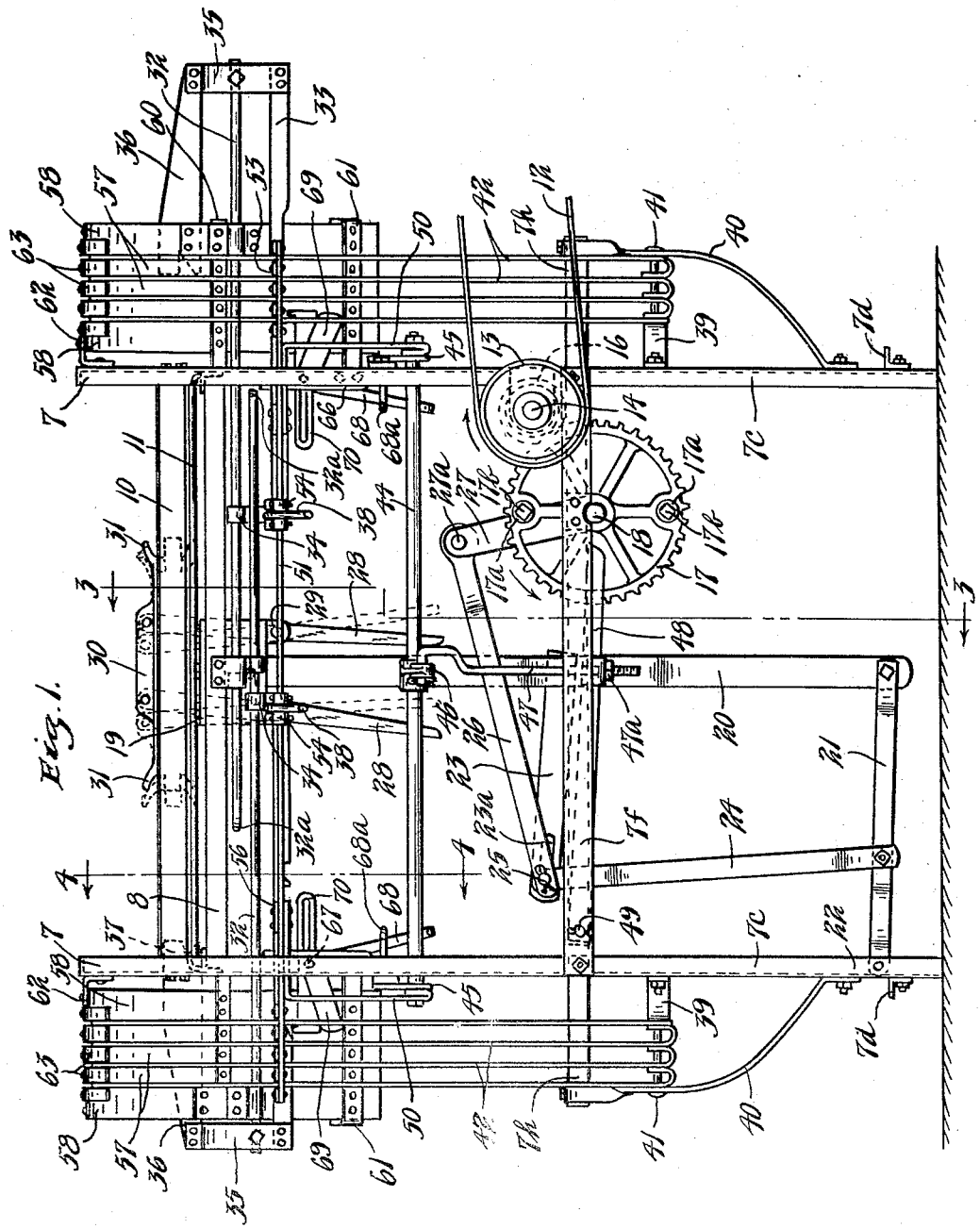

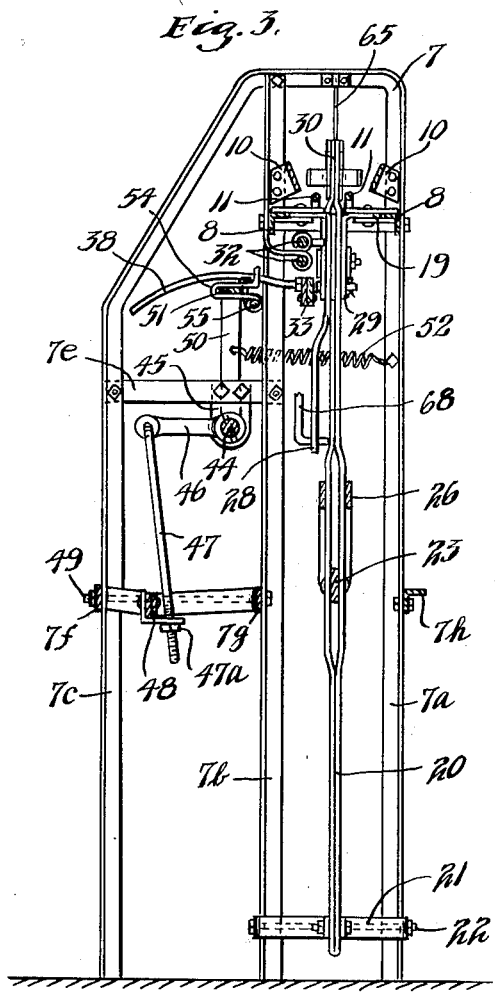

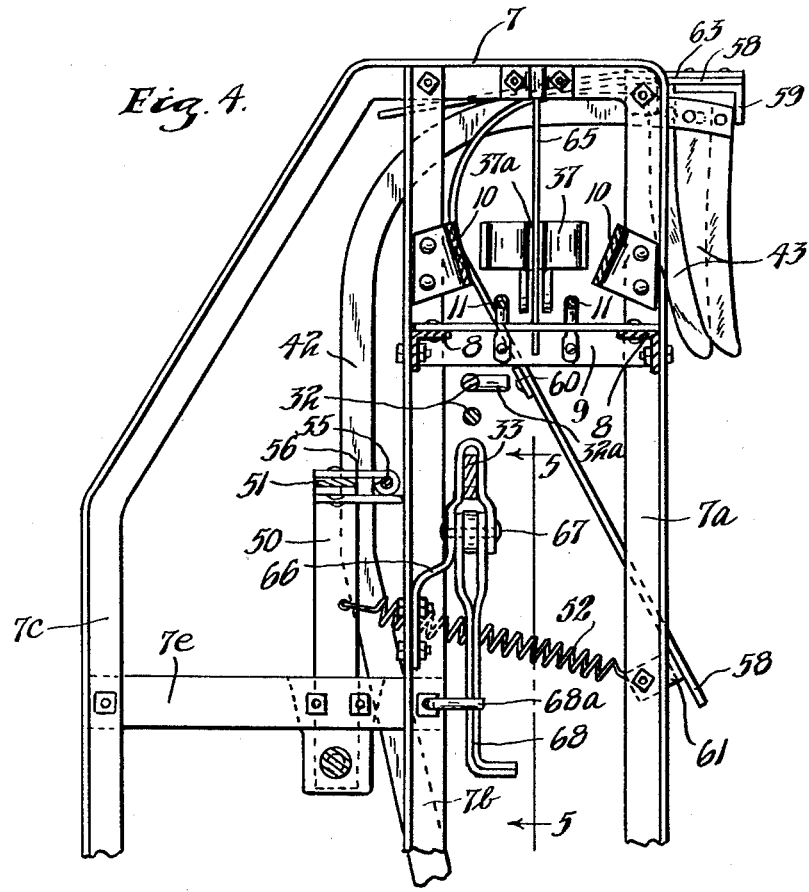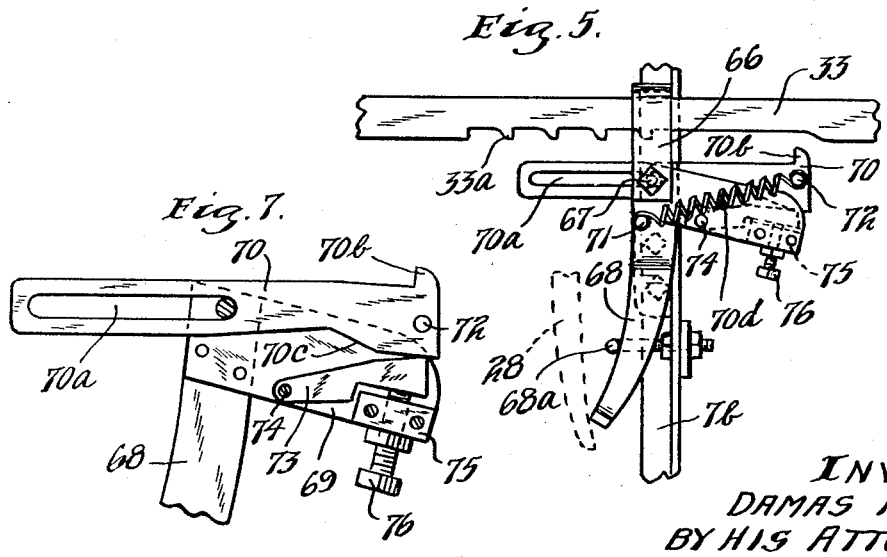

1,954,870

UNITED STATES PATENT OFFICE 1,954,870

CUTTING MACHINE FOR SEED POTATOES

Damas French, Drayton, N. Dak., assignor to George French, Drayton, N. Dak.

Application May 23, 1932, Serial No. 612,969

17 Claims. (Cl. 146—78)

My invention relates to machines for cutting seed potatoes and the like, and particularly to power driven cutting machines.

In localities where potatoes are raised in substantial quantities it is necessary to cut large quantities of seed potatoes in a short period of time immediately preceding planting. When such work is done by hand considerable labor on the part of a number of people is required. Potato cutting machines heretofore developed are objectionable in various respects. Some do not cut potatoes in pieces of uniform size and often cut small pieces from the ends of potatoes, resulting in unnecessary and sometimes excessive waste. Some machines are slow and inefficient in operation and the operation of other machines involves the hazard of the operator's hands being cut. Most machines lack means for automatic adjustment to suit various sizes of potatoes and fail to include means for automatically centering a potato with respect to the cutters thereof.

It is an object of my invention to provide a cutting machine of the class described which can be power driven to conveniently, efficiently and rapidly cut seed potatoes or the like and wherein the hands of the operator cannot readily come in contact with the cutters.

Another object is to provide a cutting machine of the class described wherein the pieces of the potatoes cut thereby are of uniform size regardless of the size of the potatoes except for the pieces cut from the ends of the potatoes and wherein the size of the pieces cut from the ends of the potatoes are never smaller than a definite minimum.

Still another object is to provide a cutting machine of the class described wherein the number of pieces into which a potato is cut thereby is automatically adjusted to suit the various sizes of potatoes which may be fed into the machine.

A further object is to provide a cutting machine of the class described wherein each potato will be longitudinally cut in two substantially equal pieces and then will be transversely cut in one or more places, the number of transverse cuts being automatically adjusted in accordance with the length of each potato, both the longitudinal cut and the transverse cut or cuts being symmetrically located with respect to the exterior surface of the potato.

A still further and more specific object is to provide a cutting machine of the class described wherein a potato is thrust from one side to the other of one knife to longitudinally cut the potato in halves, after which a suitable number of transverse cutters are automatically selected in accordance with the length of the potato and the potato is automatically shifted longitudinally to be centered with respect to the selected group of transverse cutters, whereupon the selected group of cutters transversely cut the potato.

These and other objects and advantages of the invention will be more fully set forth in the following description made in connection with the accompanying drawings, in which like reference characters refer to similar parts throughout the several views, and in which:—

Fig. 1 is a rear view of my invention in which the two extreme positions of the potato propelling members with respect to the carriage are shown, respectively, in full lines and dotted lines;

Fig. 2 is an end view with some parts partially broken away;

Fig. 3 is a vertical transverse sectional view taken along the line 3—3 of Fig. 1, as indicated by the arows;

Fig. 4 is a partial vertical transverse sectional view taken along the line 4—4 of Fig. 1, as indicated by the arrows;

Fig. 5 is a partial vertical longitudinal sectional view taken along the line 5—5 of Fig. 4, as indicated by the arrows;

Fig. 6 is a detail view showing one of the outer potato engaging members and associated parts employed to select a suitable number of cutters, the cutter engaging rod being shown in its fully retracted and fully projected positions, respectively, in full lines and dotted lines, and Fig. 7 is a detail view of a portion of the structure shown in Fig. 5.

Referring to the drawings, a frame 7, as an entirety, includes two end frames and suitable horizontal longitudinal members connecting the end frames. Each end frame consists of three columns 7a, 7b and 7c, formed of angle iron. The front column 7a and the rear column 7c are formed of one piece of angle iron bent to form a horizontal top rail extending between the upper ends of the front column 7a and the middle column 7b, and a sloping portion extending rearwardly and downwardly from the top of the column 7b to the top of the shorter rear column 7c as shown in the drawings. Near the lower ends thereof, the columns 7a, 7b and 7c are connected by means of a horizontal angle iron member 7d. Near the upper end of the column 7c, a horizontal member 7e, formed of strap iron, connects the columns 7b and 7c. At the medial portions thereof, the respective columns 7c of the two end frames are connected by a horizontal member 7f, formed of strap iron. At the same height the respective columns 7b of the two end frames are connected by a horizontal member 7g, formed of strap iron and the respective columns 7a of the two end frames are connected by a horizontal member 7h, formed of angle iron, the ends of which extend somewhat outward of the end frames.

Somewhat below the upper horizontal rails of the end frames, two horizontal longitudinally disposed guide members 8, formed of angle iron, respectively connect the respective columns 7a and the respective columns 7b of the two end frames, the vertical web of each of these members extending downward from the outer edge of the horizontal web thereof. At each end of the pair of guide members 8, a horizontal transverse member 9, formed of angle iron and extending between the columns 7a and 7b of each end frame, connects the corresponding ends of the guide member 8, the vertical web thereof extending downward from the outer edge of the horizontal web.

Above the pair of guide members 8 and somewhat inward with respect thereto is located a pair of longitudinal members 10 respectively extending between and supported by the respective columns 7a and the respective columns 7b. The members 10 are formed of strap iron and the cross sections thereof are disposed along inwardly and downwardly sloping converging lines. Between the levels at which the guide members 8 and the longitudinal members 10 are respectively located, a pair of spaced rods 11 are disposed parallel to but closer together than the guide members 8 and extending from one end frame to the other. The ends of the rods 11 are bent downward and secured respectively to the transverse members 9.

Mechanical power obtained from an electric motor, gasoline engine or other source of rotative power is transmitted to my machine by means of a belt 12, frictionally engaged with the periphery of a pulley 13 which is non-rotatably mounted on the rear end of a transverse pinion shaft 14, journaled in bearings 15 secured respectively to the upper sides of the horizontal longitudinal frame members 7f and 7g near one end thereof. A pinion 16 non-rotatably mounted on the pinion shaft 14 is meshed with a gear 17, non-rotatably mounted on a main drive shaft 18, journaled in bearings 18a which are secured respectively to the lower sides of the horizontal longitudinal frame members 7f and 7g inwardly from the pinion shaft 14.

For propelling potatoes from the point at which they are received to the point at which they are cut, a reciprocating propelling mechanism is provided. A slidable carriage 19 (see Figs. 1 and 3) is mounted on the guide members 8 for longitudinal movement thereon between the end frames as limits. The upper end of a carriage drive lever 20 is pivotally connected to the medial portion of the carriage 19 and the lower end thereof is pivotally connected to the free end of a horizontally disposed arm 21. The opposite end of the arm 21 is pivotally mounted on a pin 22 which is secured at its ends to the vertical frame members 7b and 7c at the opposite end of the frame from the pinion shaft 14. An arm 23 is pivotally attached at one end thereof to the medial portion of the carriage drive lever 20 and extends substantially horizontally outward therefrom above the arm 21. A link 24 is pivotally connected at its lower end to the medial portion of the arm 21 and extends substantially vertically upward therefrom. The end portion of the arm 23 is provided with a longitudinal slot 23a through which a pin 25 extends. The upper end of the link 24 and one end of a link 26 are pivotally mounted on the pin 25. The remaining end of the link 26 is pivotally connected to the crank pin 27a of a crank 27 mounted on the main drive shaft 17 in non-rotative relation therewith.

Each one of a pair of substantially vertically disposed double ended levers 28 is pivotally mounted at its medial portion to the lower end of one of a pair of brackets 29 depending respectively from the two ends of the carriage 19. The upper ends of the two levers 28 are pivotally attached to a potato propelling member 30 disposed between the longitudinal members 10 and above the rods 11 and carrying on each end thereof a group of outwardly flaring fingers 31 shaped to define a cup adapted to engage the inner end of a potato for propelling the same outwardly. The fingers 31 are arranged and spaced to provide a vertically disposed passage therebetween centered horizontally with respect to the cup defined by the fingers. The purpose of this passage will be explained subsequently. Stops are provided to limit the angles through which the levers 28 may be deflected from vertical positions thereof.

At each end of my machine, a restraining member for engaging the outer end of the potato and means for support of and control of the movement of said member are provided. The restraining member and the means associated therewith at one end of my machine are similar to those at the other end and hence these elements as arranged at one end of my machine are described. A projectible frame, (see Figs. 1 and 6) comprising a rod 32 and a bar 33, connected at their inner ends by a member 34, carries at its outer end a bracket 35, on which is mounted an inwardly projecting arm 36 carrying at its inner end fingers 37 shaped to define a cup adapted to engage the end of a potato. The cup thus formed is aligned with the cups formed by the fingers 31 of the potato propelling member 30 for cooperative action therewith in gripping a potato between the two cups. The fingers 37 are arranged and spaced to provide a vertically disposed passage 37a therebetween, centered horizontally with respect to the cup defined by the fingers. The purpose of this passage will be explained subsequently. The inner end of each rod 32 is bent to form a hook 32a which is in position to be engaged by one of the depending members 29 of the carriage 19 for retraction of the rod 32.

To the inner end of each of the bars 33 is secured a curved rod 38 extending therefrom toward the rear of the machine and curving downward. The curved rod 38 operates in connection with a cutter selecting mechanism to be described subsequently.

At each end of my machine a group of cutters for transversely cutting a potato and an associated actuating mechanism are provided. The above mentioned elements at one end of my machine are arranged as follows:—

Somewhat below the longitudinal member 7h, a bar 39, outwardly off set throughout its medial portion, extends horizontally from the column 7a to the column 7b. From the outer end of the longitudinal member 7h, a bar 40, secured thereto at its upper end, extends rearwardly and downwardly until almost in line with the column 7b, from which point the bar extends inwardly and downwardly to the column 7b to which the lower end thereof is secured. The ends of a longitudinally disposed horizontal bolt 41 are respectively supported in apertures in the bars 39 and 40 to form a pivot for cutter carrying arms. Four cutter carrying arms 42 are pivotally mounted at their lower ends on the rod 41, and in their normal positions, as shown in Fig. 2, extend upwardly and rearwardly to a level slightly above that of the horizontal member 7e and from this point extend vertically nearly to the top of the frame 7 and then extend forwardly in a substantially horizontal direction to a point approximately in line with the upper front portion of the frame 7. To the end portion of each cutter carrying arm is rigidly secured a depending knife or cutter 43 with its cutting edge toward the rear. A helical tension spring 42a is connected between the lower portion of each arm 42 and the longitudinal member 7h to urge the arm forward.

A knife actuating mechanism is arranged as follows:—

A longitudinally extending horizontal rocker shaft 44 journaled in bearings 45 depending from the horizontal members 7e just rearward of the columns 7b has a rearwardly extending rocker arm 46 non-rotatably mounted thereon. A depending rod 47 is pivotally connected at its upper end to the rear or outer end of the rocker arm 46.

A lever 48 is pivotally mounted at one end on a rod 49 secured at its ends in apertures in the longitudinal members 7f and 7g near the point of attachment of the members 7f and 7g to the columns 7b and 7c, at the end of the machine opposite the pinion shaft 14. The lever 48 extends toward and nearly to the shaft 18 and the outer portion thereof is disposed close to the rear side of the gear 17. Near the periphery thereof the gear 17 carries a pair of diametrically located rearwardly projecting rollers 17a mounted on pins 17b which project from the rim of the gear 17 parallel to the main drive shaft 18. The rollers 17a are positioned to alternately strike the upper surface of the end portion of the lever 48, to deflect the same downward. Below the rocker arm 46, the lever 48 is apertured and the lower end of the rod 47 passes through said apertured portion. The lower end of the rod 47 is threaded and a nut 47a is screwed on the threaded portion extending below the lever 48.

At each end of the rocker shaft 44 an arm 50, extending vertically upward therefrom when in normal position, as shown in Fig. 3, is non-rotatably mounted thereon. To the upper ends of the two arms 50 is secured a horizontal, longitudinally disposed bar 51 extending at each end to a point outward from the cutter carrying arms 42. Two helical tension springs 52 are respectively connected between the arms 50 and the respectively adjacent ones of the two columns 7a to urge the arms 42 and the bar 51 forward.

Each of the outer ends of the bar 51 is notched to receive the rear edge of each cutter carrying arm 42. Between each cutter carrying arm 42 and the adjacent arm 42, and at each end of the group of arms 42 a forwardly projecting bar 53 is secured to the bar 51. Each bar 53 is bent downward at a point forward of the arms 42 to form a hook. The rows of hooks thus formed and the front edges of the arms 42 partially define a passage of approximately circular cross-section.

A slider plate 54 slidably mounted on the bar 51 has a pair of upturned lugs 54a forming therebetween a notch in which the curved rod 38 is engaged. A horizontal rod 55, disposed parallel to the bar 51 and aligned with the loops or hooks 53 for slidable insertion therethrough is secured at its inner end to the slider plate 54 and passes through a guide 56 secured to the bar 51 midway between the medial portion and the end of the bar. The rod 55 is projectable to pass through the passage formed by the hooks 53.

At each end of the frame 7, an assembly, serving as a guard and as a guide for the cutters and as a delivery chute for cut potatoes, is attached thereto. Three members 57 formed of relatively narrow strap iron and two members 58 formed of somewhat wider strap iron are disposed in spaced relation parallel to each other with the wide surfaces thereof in line and with the wider members 58 occupying the two outer positions in the group. The front and upper end of the above described group of members is disposed immediately above the cutters 43 and is joined together by an angle iron member 59 disposed transversely with respect to the group and having its depending web at the front thereof. From the angle iron 59 (see Fig. 4) the group extends horizontally rearwardly, then curves downwardly, then curves forwardly, and extends downwardly and forwardly to a point slightly forward of the front side of the frame 7. A strap iron member 60 and a strap iron member 61 connect the individual members 57 and 58 of the group together respectively at the upper and lower ends of the downwardly and forwardly sloping portion thereof. The strap iron member 61, at its inner end, is secured to the column 7a and the upper edge of the inner end of the strap iron member 60 is notched to engage the depending web of the angle iron transverse member 9. The upper end of the group is secured to the frame by means of a clip angle 62, bolted to the top of the column 7a and to the inner one of the strip iron members 58.

Relatively short members 63, formed of strap iron of the same width as the members 57 are secured to the upper surfaces of the horizontal portions of the members 57 and 58 to form guides for the cutters 43 and the upper portions of the cutter carrying arms 42. The portions of the members 63 extending beyond the rear ends of the horizontal portions of the members 57 and 58 extend rearward and slightly downward.

A sheet 64 of metal having a suitable shape closes the outer end of the space defined by the members 57 and 58, as indicated in Fig. 2, except for an opening provided for passage of the cup formed by the fingers 37.

Provision is made for longitudinally cutting a potato in halves as it is projected outward by the potato propelling member 30. At each end of the machine, a vertically disposed cutter or knife 65, secured at its upper end to the top rail of the corresponding end frame and retained at its lower end in an aperture in the corresponding transverse member 9, is horizontally centered with respect to the pair of longitudinal members 10 and is positioned with its cutting edge toward the medial portion of the longitudinal members 10. The potato propelling member 30 and the inner portion of the arm 36, as previously described, are provided with passages to receive the knife 65 when said members are projected through the location in which the knife is situated.

A mechanism is provided at each end of the machine for centering a potato in its projected position with respect to the transverse cutters 43. At the medial portion thereof, the lower edge of the bar 33 is partially cut away to define four ratchet teeth 33a as shown in Fig. 5. A bracket 66, as shown in Fig. 4, is secured to the column 7b and from the point of support extends upward at the rearward side of the bar 33, over the top of the bar, and downward at the forward side of the bar 33, to form a guide through which the bar may slide longitudinally. A horizontal pin 67 extends through apertures respectively located in the upward extending portion and a depending part of the downward extending portion of the bracket 66 described above.

A depending lever 68, having a forked upper end, is pivotally mounted at its upper end on the pin 67. The lower portion of the lever 68 is curved slightly inward and the lower end thereof is bent forwardly at right angles for engagement by the lower end of the lever 28 and the upper end of lever 68 rigidly carries a bell crank arm 69, comprising a pair of spaced substantially oblong plates secured to the lever 68 substantially at right angles thereto and projecting outwardly from the upper end thereof, as best shown in Fig. 7. A pawl carrying slidable bar 70 is disposed between the two plates of bell crank arm 69. The pin 67 extends through a longitudinal slot 70a cut horizontally through substantially the length of the inner half of the bar 70. A pawl 70b extends upward from the outer end of the upper side of the bar 70. The lower side of the outer end of the bar 70 is formed into a cam surface 70c as best shown in Fig. 7. A lever 73, disposed between the plates of the bell crank arm 69 below the pawl carrying bar 70, pivotally mounted on a pin 70f at its inner end, and extending outwardly therefrom to the outer end of the bell crank arm 69 is shaped as best shown in Fig. 7. A helical tension spring 70d is stretched between a pin 71 mounted on the lever 68 and a pin 72 mounted on the pawl carrying bar to urge the same inwardly. The lower and outer corner portions of the plates forming the bell crank arm 69 are connected by a spacing block 75. A screw 76 passes upward through a threaded aperture in the block 75 to make contact at its upper end with the lower side of the outer end portion of the lever 73. A stop 68a secured to the column 7b is positioned to engage the lower portion of the lever 68 to limit inward deflection thereof.

Operation

The pulley 13 and the pinion shaft 14 are rotated in a clockwise direction as viewed in Fig. 1 by power transmitted through the belt 12 from a source of rotative mechanical power, such as a motor or an engine. The pinion 16, fixed to the shaft 14, drives the gear 17, with which it is meshed, and the main drive shaft 18, on which the gear is fixed, in a counter clockwise direction. The crank 27 fixed to the main drive shaft 18 is rotated in a counter clockwise direction and, through the link 26, oscillates the link 24 and the pin 25. The pin 25 in conjunction with the slot 23a of the lever 23 form a lost motion connection through which the oscillating link 24 is connected to the carriage drive lever 20 to produce oscillation of the same with a short period of time at each extreme position thereof wherein no movement of the lever 20 takes place. The carriage 19 driven by the lever 20 travels alternately from one end to the other of the guide members 8 and at each end of its path remains stationary during the short period of time referred to above.

When the carriage and the potato propelling member 30 carried thereby are at or near one end of the guides 8, a potato to be cut is placed in a longitudinally disposed position between the propelling member 30 and the other end of the guides 8 between the longitudinal members 10 and resting upon the rods 11. As the propelling member 30 moves toward the last mentioned end of the guides 8, the fingers 31 of the propelling member engage the inner end of the potato, after which the potato is pushed outwardly toward the end of the guides 8. As the potato reaches the end of the guides 8 it is pushed against the knife 65 and is longitudinally cut into halves. The outer end of the potato, as it passes the knife 65, engages the fingers 37 on the arm 36, (see Fig. 6) and the arm 36, bracket 35, rod 32 and bar 33 are moved outward by force transmitted from the propelling member 30 through the potato. The curved rod 38 carried by the now outwardly moving bar 33 is engaged with the upturned lugs 54a of the slider plate 54 which is secured to the inner end of the projectable rod 55. The rod 55 is obviously projected outward and enters the passage defined by the hooked portions of the members 53 and the front edges of the cutter carrying arms 42. When the propelling member 30 has reached its outermost position the rod 55 will have been projected to engage the front edges of a number of the cutter carrying arms 42 corresponding to the length of the potato. As the carriage 19 approaches its outermost position, one of the levers 28 depending therefrom engages the lower end of the lever 68 (see Figs. 1 and 6) and moves the lever 68 in a counter clockwise direction as viewed in Figs. 5 and 7. Counter clockwise swinging of the lever 68 raises the pawl 70b into engagement with one of the ratchet teeth 33a of the bar 33. The particular ratchet tooth 33a which is engaged depends upon the position of the bar 33, which, in turn, depends upon the length of the potato. As the last part of the movement of the carriage 19 toward the outermost end of its travel is effected, the pawl carrying bar 70 is pulled outward longitudinally against the tension of the spring 70d, the distance through which it is pulled being determined by the length of the potato. The length of the above mentioned distance determines what part of the cam surface 70c will be in contact with the upper surface of the short lever 73 and hence what angle will exist between the bar 70 and the bell crank arm 69. From the above, the position of the lower end of the lever 68 and hence the angle of the lever 28 with respect to vertical are determined. The angle of the lever 28 determines the distance through which the potato is moved outward with respect to the carriage 19 when the same is in its outermost position and hence determines the position of the potato with respect to the group of transverse cutters selected for operation as previously described. The shape of the cam surface 70c is so designed that a potato of any length will be centered with respect to the group of transverse cutters selected.

As the potato comes to rest in its outermost position, one of the rollers 17a carried by the rim of the gear 17 strikes the upper side of the free end of the lever 48 and depresses the same. Depression of the lever 48 (see Fig. 3) pulls the rod 47 and the rocker arm 46 downward. The rocker arm 46 rocks the rocker shaft 44 and the arms 50 counter clockwise, as viewed in Figs. 2 and 3, and moves the bar 51 carried by the arms 50 rearward to pull the selected group of cutter carrying arms 42 rearward. Rearward motion of the cutter arms 42 pulls the transverse cutters 43 through the potato, after which the pieces of the potato drop and slide down the chute formed by the lower portions of the strap iron members 57 and 58.

Further rotation of the gear 17 carries the roller 17a out of engagement with the outer end of the lever 48. The springs 42a then pull the cutter carrying arms 42 and the bar 51 forward and rotate the rocker shaft 44 to swing the rocker arm 46 upward and move the rod 47 and the outer end of the lever 48 upward into normal position.

As the crank 27 is further rotated, the link 26 first pushes the pin 25 through the length of the slot 23a and then moves the arm 23 and carriage drive member 20 to propel the carriage 19 toward the opposite end of the guides 8. As this movement of the carriage 19 begins, the lever 28 leaves engagement with the lever 68 and the pawl 70b is allowed to drop out of engagement with the ratchet teeth 33a of the bar 33.

As the carriage 19 nears the opposite end of the guides 8, a depending bracket 29 on the carriage engages the hooked portion of the inner end of the rod 32 and carries the rod 32 therewith to return the arm 36 the potato engaging fingers 37 and the projectible rod 55 inward to their respective normal positions.

The cycle of operation described above is repeated continuously at each end of my machine, the mechanisms at the respective ends alternating fingers 37 and the projectable rod 55 inward lar part of the operation.

It is apparent that I have invented a new and improved form of cutting machine for seed potatoes and the like, which is suitable to be driven by power if desired, wherein seed potatoes may be conveniently, rapidly, and efficiently cut without danger of the operator's hands becoming cut, wherein the size of the pieces cut is substantially uniform and never smaller than a definite minimum, and wherein the number of pieces cut is automatically adjusted to suit the size of each potato.

It will be understood that my invention is applicable not only for cutting seed potatoes, but may be used for cutting many other objects and materials. It is obvious that my invention may or may not be power driven and may or may not be provided with cutting elements at both ends thereof.

It will, of course, be understood that various changes may be made in the form, details, arrangement and proportions of the apparatus without departing from the scope of my invention, which, generally stated, consists in a device capable of carrying out the objects above set forth and in the novel parts and combinations of parts disclosed and defined in the appended claims.

What is claimed is:—

1. In a cutting machine for seed potatoes and the like, means for holding an object to be cut, said means being adjustable to suit the size of said object, a plurality of spaced movably mounted cutters, means for producing relative movement of one or more of said cutters with respect to said holding means, the remaining ones of said cutters being allowed to remain stationary and the ones of said cutters to be moved being positioned to pass through an object held by said holding means when said relative movement is effected, and means controlled and operated by said holding means for selecting for said relative movement a number of said cutters proportional to the size of said object.

2. In a cutting machine for seed potatoes and the like, means for holding an object to be cut, said means being adjustable to suit the size of said object, a plurality of spaced movably mounted cutters, means for producing relative movement of one or more of said cutters with respect to said holding means, the remaining ones of said cutters being allowed to remain stationary and the ones of said cutters to be moved being positioned to pass through an object held by said holding means when said relative movement is effected, and means controlled by said adjustable holding means for automatically selecting for movement a number of said cutters proportional to the size of said object.

3. In a cutting machine for seed potatoes and the like, a propelling element for moving an object to be cut, a restraining or abutment element mounted to be engaged by the outer end of the moving object and mounted for movement with said object, a plurality of spaced movable cutting elements for dividing the object, means for producing relative movement of one or more of said cutters with respect to said holding means the remaining ones of said cutters being allowed to remain stationary and means operated and selectively controlled by the movement of said restraining element for determining the number of said cutting elements to be operated, in accordance with the size of said object.

4. In a cutting machine for seed potatoes and the like, a propelling element for moving an object to be cut, a restraining or abutment element mounted to be engaged by the outer end of the moving object and yieldably mounted for movement with said object, a plurality of movable cutting elements mounted transversely to the path of said propelling element, means controlled by the movement of said retraining element for selectively determining the number of said cutting elements to be operated, means for operating said cutting elements and means dependent upon the distance between the propelling element and abutment element for symmetrically positioning the object to be cut with reference to the cutting elements selected just prior to the operation of said cutting elements.

5. The structure defined in claim 4, wherein the last mentioned means effects an adjustment and further movement of said propelling element just prior to the operation of the cutting elements.

6. In a cutting machine for seed potatoes and the like, a guide in which an object to be cut may be placed, a propelling element associated with said guide and adapted for movement to propel said object longitudinally outwardly in said guide, a restraining element associated with said guide and longitudinally movable with respect thereto, and a cutter secured to the outer end portion of said guide, said restraining element being slotted to receive said cutter and the inner portion of said restraining element, when the same is at the inner limit of its movement extending to a point inwardly of said cutter.

7. In a cutting machine for seed potatoes and the like, a source of mechanical power, a trough adapted to receive a potato, a carriage mounted in said trough for longitudinal movement therein, a cup adapted to engage one end of a potato secured to one end of said carriage, a restraining element mounted for longitudinal movement with respect to said trough, a cup adapted to engage the remaining end of said potato mounted on said restraining element, a knife mounted at one end of said trough centered with respect thereto, means for causing said cups to grip said potato, slots in said cups to permit passage thereof past said knife, means associated with said source of power for moving said carriage toward said knife to a point where a potato gripped by said cups will have been cut in halves by said knife, a plurality of spaced knives mounted for transverse movement relative to said trough and located outward of the end of said trough, means associated with said source of power for transversely moving one or more of said knives, means for selecting for movement a number of said knives corresponding to the distance between said cups, and means for disposing said cups symmetrically with respect to the paths of the knives selected.

8. In a cutting machine for seed potatoes and the like, a guide in which an object to be cut may be placed, a propelling element associated with said guide and adapted for movement to propel said object longitudinally outwardly of said guide, said propelling element being adapted to engage the inner end of said object, a restraining element associated with said guide and longitudinally movable with respect thereto, said restraining element being adapted to engage the outer end of said object, a cutter secured to the outer end portion of said guide, said propelling element being slotted to receive said cutter, said restraining element being slotted to receive said cutter, means for projecting said propelling element outwardly to a point where an object engaged by said propelling element and said restraining element will lie outwardly of said cutter, a second cutter mounted for movement to transversely pass through said object when said propelling element is in its projected position, means for effecting said movement of said second cutter, a source of mechanical power, mechanical transmission means connecting said source of power to said propelling element to cause reciprocation thereof, a lost motion connection in said transmission to cause said propelling element to remain motionless in its projected position for a portion of each cycle of operation, mechanical transmission means between said source of power and said second cutter to cause said cutter to pass through said object during said portion of each cycle.

9. In a cutting machine for seed potatoes and the like, a guide in which an object to be cut may be placed, a cutter secured to the outer end of said guide, a propelling element associated with said guide and adapted for movement to propel said object longitudinally outwardly from said guide, said propelling element being adapted to engage the inner end of said object, a restraining element associated with said guide and longitudinally movable with respect thereto, said restraining element being adapted to engage the outer end of said object, the outer portion of said propelling element and the inner portion of said restraining element each being slotted to receive said cutter, and means for projecting said propelling element outwardly to a point where the outer portion thereof extends outwardly of said cutter whereby said object and said restraining element will be positioned outwardly of said cutter, said restraining element being adapted to extend, when at the inner limit of its movement, to a point inwardly of said cutter.

10. The structure defined in claim 9 and a second cutter mounted for movement to transversely pass through said object when said propelling element is in its projected position, and means for effecting said movement of said second cutter.

11. In a cutting machine for seed potatoes and the like, means for holding an object to be cut, said means being adjustable to suit the size of said object, a plurality of movably mounted cutters, each of said cutters being adapted for movement independently of the remaining cutters and relative to said holding means, said cutters being positioned to pass through said object when said relative movement is effected, an operating member for and common to all of said cutters, means controlled by said adjustable holding means for automatically establishing actuating connections between said operating member and one or more of said cutters.

12. In a cutting machine for seed potatoes and the like, means for holding an object to be cut, a plurality of spaced cutters, each of said cutters being mounted for movement independent of the others and positioned to pass through an object held by said holding means when suitably moved relative to said holding means, means for producing such movement of one or more of said cutters while permitting the remaining ones of said cutters to remain stationary, and means operated by said holding means for selecting for such movement a number of cutters proportional to the size of said object.

13. In a cutting machine for seed potatoes and the like, a propelling element for moving an object to be cut, a restraining or abutment element mounted to be engaged by the outer end of the moving object and yieldably mounted for movement with said object, a plurality of movable cutting elements mounted transversely to the path of said propelling element, means for operating said cutting elements and means dependent upon the distance between said propelling element and said abutment element for symmetrically positioning the object to be cut with reference to said cutting elements just prior to the operation of said cutting elements, wherein the last mentioned means suitably alters the movement of said propelling element during the latter part of the stroke thereof.

14. In a cutting machine for seed potatoes and the like, a propelling element for moving an object to be cut, a restraining or abutment element mounted to be engaged by the outer end of the moving object and yieldably mounted for movement with said object, a plurality of movable cutting elements mounted transversely to the path of said propelling element, means controlled by the movement of said restraining element for selectively determining the number of said cutting elements to be operated, means for operating said cutting elements and means dependent upon the distance between said propelling element and said abutment element for symmetrically positioning the object to be cut with reference to the cutting elements selected just prior to the operation of said cutting elements wherein the last mentioned means suitably alters the movement of said propelling element during the latter part of the stroke thereof.

15. In a cutting machine for seed potatoes and the like, a reciprocable carriage, a propelling element for moving an object to be cut, mounted on said carriage for relative movement thereto in the direction of movement thereof, a restraining or abutment element mounted to be engaged by the outer end of the moving object and mounted for movement with said object, a plurality of movable cutting elements mounted transversely to the path of said propelling element, means for operating said cutting elements and means dependent upon the distance between said propelling element and said abutment element for adjusting the position of said propelling element relative to said carriage whereby said object will be symmetrically positioned with respect to said cutting elements just prior to operation of said cutting elements.

16. In a cutting machine for seed potatoes and the like, a reciprocable carriage, a propelling element for moving an object to be cut, said element being mounted on said carriage for movement relative thereto in the direction of movement thereof, a restraining or abutment element mounted to be engaged by the outer end of the moving object and mounted for movement with said object, a plurality of movable cutting elements mounted transversely to the path of said propelling element, means for operating said cutting elements, a member extending from said propelling element and a member connected with said abutment element, said members being arranged to cooperate to adjust the position of said propelling element relative to said abutment element.

17. The structure defined in claim 16 wherein a member extending from said propelling element is shiftable to change the position of said propelling element relative to said carriage and the shifted position of said shiftable member is dependent upon the position of said abutment element.

DAMAS FRENCH.